(12) United States Patent
Brunson et al.

(10) Patent No.: US 8,830,056 B2
(45) Date of Patent: Sep. 9, 2014

(54) INTELLIGENT MUSIC ON HOLD

(75) Inventors: Gordon R. Brunson, Broomfield, CO (US); Richard L. Robinson, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 909 days.

(21) Appl. No.: 12/960,314

(22) Filed: Dec. 3, 2010

(65) Prior Publication Data

US 2012/0139726 A1    Jun. 7, 2012

(51) Int. Cl.
*G08B 21/00*  (2006.01)
*H04M 3/428*  (2006.01)
*H04M 3/56*   (2006.01)

(52) U.S. Cl.
CPC .............. *H04M 3/4285* (2013.01); *H04M 3/56* (2013.01); *H04M 2201/18* (2013.01)

USPC ....................................... 340/540; 348/14.07

(58) Field of Classification Search
USPC ........... 340/540; 348/14.07, 14; 370/352, 458
See application file for complete search history.

(56) References Cited

U.S. PATENT DOCUMENTS 6,556,670 B1 *  4/2003  Horn .................... 379/202.01
6,870,807 B1    3/2005  Chan et al.

* cited by examiner

*Primary Examiner* — Shirley Lu
(74) *Attorney, Agent, or Firm* — Sheridan Ross P.C.

(57) ABSTRACT

Prior art solutions only implement absolute music-on-hold suppression at the conference bridge. The present disclosure moves the intelligence and control capabilities to the entity implementing music-on-hold functionality and also provides mechanisms for applying the music-on-hold treatment more intelligently. Intelligent and flexible music-on-hold control algorithms are disclosed which make conference participation more convenient and enjoyable.

15 Claims, 6 Drawing Sheets

INTELLIGENT MUSIC ON HOLD

FIELD OF THE DISCLOSURE

The present disclosure is generally directed toward communications and more specifically conferencing solutions.

BACKGROUND

Often times during a conference call, a participant to the conference call may place the call on hold to attend to some other activity. Sometimes the participant may have a music-on-hold feature that causes a server to provide music to the rest of the conference participants while the user is on hold. Sometimes, when Session Initiation Protocol (SIP) is used, the server providing the on-hold music is joined to the conference via utilization of an INVITE/Replace, which causes the server to replace the endpoint that has placed the conference on hold. Unfortunately, there are many instances where the music-on-hold is played when the participant places any call on hold. While music-on-hold is useful for two person communications, it can be quite annoying for multi-party communications when the remaining participants still want to communicate but have to do so over the music-on-hold.

Present solutions to this problem are limited in two ways. First, present solutions are implemented at the conference bridge, which generally means that they can only be implemented when a conference is hosted on a conferencing server that has a significant amount of processing capabilities. Present solutions are not readily implemented on conferences which are hosted locally (e.g., where a communication endpoint owns the conference and mixes the various inputs of the participants).

Second, present solutions absolutely remove music-on-hold during a conference. This is limited because there may be instances during a conference in which it is desirable to hear the music-on-hold (or similar indicator) so that participants know the other person has placed them on hold and has not disconnected. It is only desirable, however, when there is silence to be filled.

SUMMARY

It is with respect to the above issues and other problems that the embodiments presented herein were contemplated. This disclosure proposes, among other things, a more intelligent mechanism for suppressing music-on-hold or providing other on-hold indicators during conferences. More specifically, the present disclosure provides a self-regulating on-hold server or application that is capable of monitoring voice activity of other participants to a conference when the music-on-hold has been activated for one participant. If the on-hold server or application detects voice activity, then the music or background noise which would otherwise be provided back to the callers is suppressed either partially (i.e., through reduced amplitude) or completely. Thus, music may still be provided to the other participants, but only enough to fill the silence. Some embodiments provide the ability to play an on-hold indicator (e.g., beep, tone, or series of beeps or tones) during pauses in the conversation rather than actually playing the music-on-hold. Some embodiments provide the ability to play an announcement (e.g., "Alice is on hold") during pauses in the conversation in combination with one or more of an on-hold indicator and/or music-on-hold. The on-hold indicator solution can also be used in combination with a music-on-hold solution or can be a stand-alone solution.

If absolute music-on-hold suppression is utilized, then once voice activity is detected the music-on-hold server or application may start a timer that counts a predetermined amount of time. During that predetermined amount of time the music-on-hold server or application may not continue to monitor the voice activity on the call, but instead may maintain suppression of the music for the predetermined amount of time. Alternatively, or in addition, an on-hold indicator can be played during some or all of the predetermined amount of time.

After the timer has expired, the music-on-hold server or application may re-analyze the voice activity of the other participants to determine if suppression is still needed. If no voice activity is detected, then the music-on-hold server may begin playing music back to the other participants until more voice activity is detected, at which point the process is repeated.

If partial suppression is utilized, then the music-on-hold server or application may continually monitor the voice activity of other participants on the call and adjust the volume of the music played back to the other participants based on one or more parameters of the detected voice activity. Specifically, the volume of the music played back may be adjusted based on frequency of voice activity, amplitude of voice activity, or combinations thereof.

Both the absolute suppression and partial suppression proposed herein still allows the music or on-hold indicator to be played to fill the silence of the conference call and let other participants still know that they have been placed on hold and not been disconnected from the other caller. Furthermore, by implementing the monitoring and control algorithms at the on-hold server or application rather than the conference bridge, embodiments of the present disclosure can be easily applied to conferences of multiple parties hosted on any device as well as two-person calls. Suppression of music-on-hold during a two person conference may be desirable if the other participant that has been placed on hold wishes to talk to someone in their office without hearing the music-on-hold through their communication device.

Accordingly, exemplary embodiments of the present invention provide a method, which includes:

while a conference is established between at least a first and second participant utilizing a first and second communication device, respectively, determining that the first participant has put the conference on hold with the first communication device;

at a first time while the first participant has put the conference on hold, analyzing one or more conference parameters of interest to determine conference activity;

determining, at the first time, that conference activity has been detected;

in response to determining, at the first time, that conference activity has been detected, providing a first on-hold treatment to at least the second participant;

at a second time while the first participant has put the conference on hold, analyzing one or more conference parameters of interest to determine conference activity;

determining, at the second time, that conference activity has not been detected; and in response to determining, at the second time, that conference activity has not been detected, providing a second on-hold treatment to at least the second participant.

The types of on-hold treatments which may be provided include completely suppressing music-on-hold and other on-hold indicators, partially suppressing (e.g., providing at a reduced amplitude or providing to a subset of participants that have not placed the conference on hold) music-on-hold and other on-hold indicators, or providing one or more of music-on-hold and other on-hold indicators. Moreover, the types of on-hold treatments provided to the conference participants may vary dynamically according to the current state of the conference and the current activity of the conference participants.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1A:
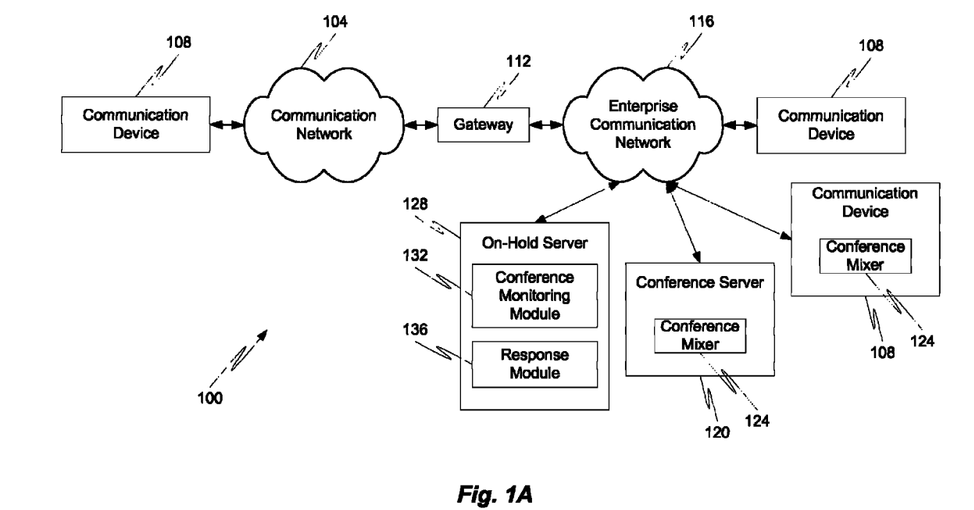
FIG. 1A is a block diagram of a communication system in a first configuration in accordance with embodiments of the present disclosure.

FIG. 1A shows an illustrative embodiment of a communication system 100 in a first configuration in accordance with at least some embodiments of the present disclosure. The communication system 100 includes one or more communication networks 104, 116, which facilitate conferences, which may also be referred to as communication sessions, between two or more communication devices 108.

In some embodiments, an enterprise communication network 116 is separated from the communication network 104 by a gateway 112, which acts as a physical and logical barrier between the enterprise communication network 116 and the communication network 104. The gateway 112, while not necessary, is usually desirable to control security of the enterprise communication network 116.

It should also be noted that while two networks 104, 116 are depicted, embodiments of the present disclosure may be implemented with greater or fewer networks. For example, a first communication device 108 connected to a first enterprise communication network 116 may be engaged in a conference with a second communication device 108 connected to a second enterprise communication network 116. The first and second enterprise communication networks 116 may be separated by the communication network 104 and two or more gateways 112. As another example, all communication devices 108 involved in a conference may be connected to the same enterprise communication network 116, in which case the communication network 104 is not needed to carry communication packets between the communication devices 108.

In some embodiments, the communication network 104 may correspond to an un-trusted communication network that does not have any unitary set of rules or protocols for maintaining the safety and security of information shared across the communication network 104. The enterprise communication network 116, on the other hand, may be administered by a single enterprise or business and may, therefore, be administered with a strict set of security rules. In such a configuration, the gateway 112 may comprise functionality to (1) filter out un-trusted or unwanted communications from the communication network 104 and (2) translate communications from the communication network 104 such that the communications can be handled according to the protocols of the enterprise communication network. 116.

In a very simple example, the communication network 104 may correspond to a circuit-switched communication network and the enterprise communication network 116 may correspond to a packet-switched communication network. In another very simple example, the communication network 104 and enterprise communication network 116 may both correspond to a packet-switched communication network, but may utilize different communication protocols. In a more specific example, the enterprise communication network 116 may correspond to a Session Initiation Protocol (SIP)-based or H.323-based network and the communication network 104 may correspond to the Internet.

In accordance with at least some embodiments of the present disclosure, one or both of the communication networks 104, 116 may comprise any type of known communication medium or collection of communication media and may use any type of protocols to transport messages between endpoints. The communication networks 104, 116 may include wired and/or wireless communication technologies. The Internet is an example of the communication network 104 that constitutes and Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a SIP network, a cellular network, and any other type of packet-switched or circuit-switched network known in the art.

Examples of the enterprise communication network 116 include, without limitation, a LAN, a WAN, a SIP network, an H.323 network, or combinations thereof. In addition, it can be appreciated that the communication networks 104, 116 need not be limited to any one network type, and instead may be comprised of a number of different networks and/or network types. Moreover, the communication networks 104, 116 may comprise a number of different communication media such as coaxial cable, copper cable/wire, fiber-optic cable, antennas for transmitting/receiving wireless messages, and combinations thereof.

In accordance with at least some embodiments of the present disclosure, the communication devices 108 may comprise any type of known communication equipment or collection of communication equipment. Examples of suitable communication devices 108 include, but are not limited to, a personal computer, laptop, Personal Digital Assistant (PDA), cellular phone, smart phone, digital phone, softphone, telephone, or combinations thereof. In general each communication device 108 may be adapted to support one or more of video, audio, text, and/or data communications with other communication devices 108. The type of medium or media used by the communication device 108 to communicate with other communication devices 108 may depend upon the communication applications available on the communication devices 108 and the network to which the communication device 108 is attached.

Each communication device 108 may be configured to engage in one, two, three, or more conferences with one or more communication devices 108 at substantially the same time. In some embodiments, a communication device 108 may be equipped with a conference mixer 124, which enables the communication device 108 to host conferences between three or more communication devices 108 locally rather than utilizing a dedicated conference server 120 to host the multi-participant conference. The conference mixer may comprise any type of device or collection of devices configured to mix the media streams from the various conference participants and provide the mixed signal to other participants. In some embodiments, the conference mixer 124 may also comprise the capability to remove inputs (or fail to incorporate inputs) of a particular user from a mixed signal before the mixed signal is provided back to that particular user (to ensure that the particular user does not hear him/herself on the mixed signal).

The size of the conference mixer 124 on the communication device 108 may be smaller than conference mixers 124 available on a conference server 120. Therefore, it may be preferable to host large conferences (e.g., with ten or more participants) at the conference server 120 rather than at the communication device 108, which may have significantly lesser processing capabilities than the conference server 120.

Exemplary types of conferences, whether between two, three, four, or more communication devices 108, which may be supported by the communication device 108 include, without limitation, voice conferences, video conferences, text conferences, multi-media conferences, and any other real-time, near-real-time, or non-real-time conferences. Generally speaking, however, the conference mixer 124 is primarily used for real-time conferences between three or more communication devices 108.

In embodiments where real-time conferences are established with the communication device 108, media packets and session control packets may be transmitted to/from the communication device 108 across the communication network(s) 104, 116 to the other communication devices 108 engaged in the conference. The media packets transmitted during a communication session generally contain the media payload of the communication session (e.g., voice, video, and text data). The session control packets may include commands for controlling the communication session, commands for controlling the path across which the media packets are transmitted between the communication devices 108, and the like.

The communication system 100 may further include an on-hold server 128, which may operate as a source of on-hold music, as well as provide certain treatments when one or more communication devices 108 place a conference (or other participants of a conference) on hold. In some embodiments, the on-hold server 128 includes a conference monitoring module 132 and a response module 136. The conference monitoring module 132 is responsible for monitoring activity of participants on a conference. As can be appreciated, the conference monitoring module 132 may be configured to monitor a conference when all participants are engaged in the conference and when one or more participants have placed the conference on hold with their communication device 108. In some embodiments, the conference monitoring module 132 analyzes one or more conference parameters of interest and provides the data obtained from the conference to a response module 136.

In particular, the conference monitoring module 132 is configured to monitor one or more of conference participant activity in the form of voice activity (volume), frequency of voice activity, amplitude of voice activity, number of participants providing voice activity (i.e., since detecting activity from only one communication device 108 while another communication device 108 has placed the conference on hold would not necessarily indicate that the activity corresponds to conference activity), whether participants are responding to other participants, participant movement (i.e., for video conferencing), participant presence (i.e., whether a participant is in front of the video camera), and the like.

The response module 136 is configured to provide one or more automated responses to conference participants based on input received from the conference monitoring module 132. In some embodiments, the response module 136 is configured to provide music to conference participants when at least one participant has placed the conference on hold. In some embodiments, the response module 136 is configured to provide one or more audible on-hold indicators (e.g., beeps, tones, etc.) to conference participants when another conference participant has placed the conference on hold. Such audible on-hold indicators or music-on-hold may be provided over the connection established for the conference or over an alternative communication channel, such as a whisper channel. The response module 136 may also be configured to provide one or more visual on-hold indicators (e.g., flashing lights, text messages, etc.) during video conferences.

The response module 136 may also be configured to determine when music or an on-hold indicator should not be played to conference participants. In particular, if the conference monitoring module 132 determines that voice activity is present on a conference even though one participant has placed the conference on hold, the response module 136 may determine that music should not be played and may or may not provide an on-hold indicator, depending upon the amount and quality of activity detected on the conference.

As can be seen in FIG. 1A, the on-hold server 128 is depicted as being separate from the conference server 120. Embodiments of the present disclosure contemplate such a configuration and many other configurations. For example, the functionality of the on-hold server 128 and conference server 120 may be implemented on a single server which is connected to the enterprise communication network 116. In some embodiments, the on-hold server 128 may be separate from the conference server 128 and may connect to the conference mixer 124 as any other communication device 108 would connect to the conference mixer 124 (regardless of whether the conference mixer 124 is on the conference server 120 or communication device 108). In still other embodiments, functions of the on-hold server 128 may be provided as applications on a communication device 108, thereby enabling local monitoring of conferences and conference activity.

In some embodiments, the functionality of the conference server 120 and/or on-hold server 128 may be implemented as a sequenced application that is inserted into a call sequence, which means that control signals and media packets of the conference travel through the conference server 120 and/or on-hold server 128 before being provided to the destination communication device 108. The on-hold server 128 may be sequenced on one or both of the origination side and terminal side of the conference call. Additional details related to sequenced applications and the operations thereof are discussed in U.S. patent application Ser. Nos. 12/783,224 and 12/783,249, both filed May 19, 2010, the entire disclosures of which are hereby incorporated herein by reference.

Both the on-hold server 128 and conference server 120 may be connected to the enterprise communication network 116, which means that the functionality of both components are hosted by a common enterprise or business entity.

Figure 1B:
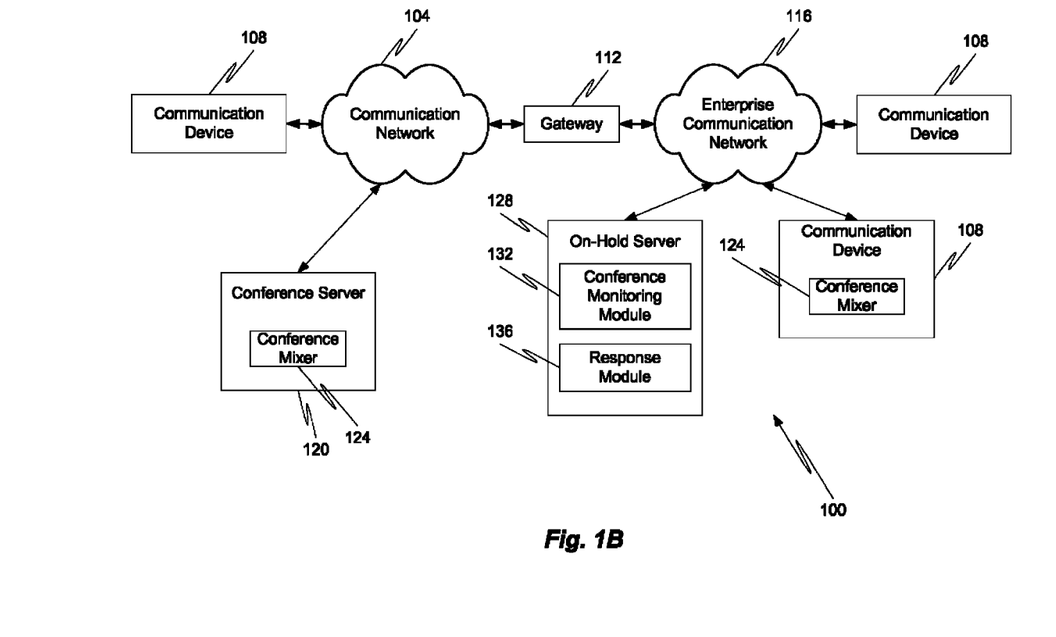
FIG. 1B is a block diagram of a communication system in a second configuration in accordance with embodiments of the present disclosure.

In the alternative system 100 configuration depicted in FIG. 1B, the conference server 120 may be hosted outside of the enterprise communication network 116. The remotely-hosted conference server 120 of FIG. 2 may be reached by having each conference participant dial a dedicated number and a specific conference mixer 124 may be obtained from the conference server 120 by entering a predetermined conference code which has been assigned to the conference. In some embodiments, the conference server 120 may be implemented in a cloud-based solution as a shared resource.

Although not depicted, the on-hold server 120 may also be remotely-hosted, meaning that the on-hold server 120 is not connected to the enterprise network 116. Other topological alterations of the system 100 components may also be utilized although such alterations are not discussed in detail herein.

Figure 2:
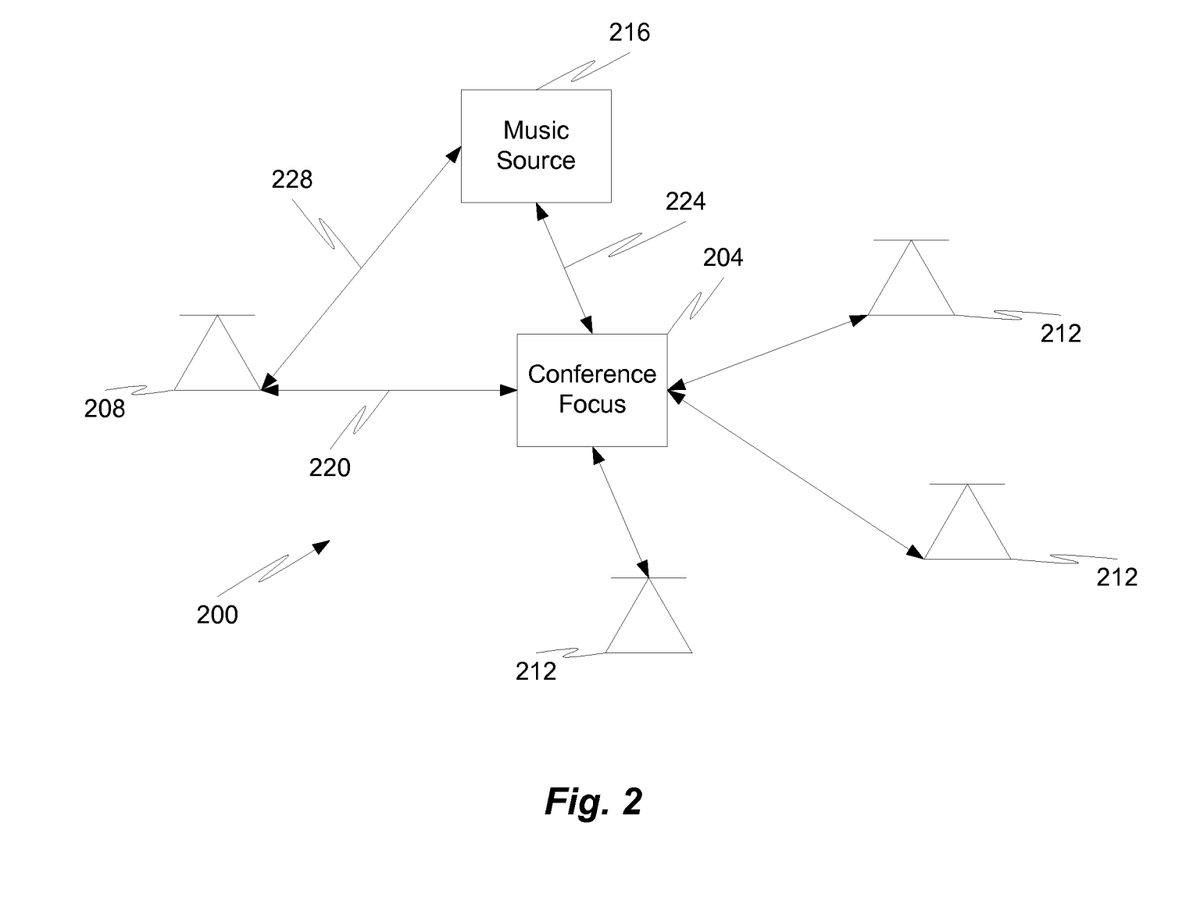
FIG. 2 is a block diagram of a conference topology in accordance with embodiments of the present disclosure.

With reference now to FIG. 2, a conference topology 200 will be described in accordance with at least some embodiments of the present disclosure. The conference topology 200 is set up such that a plurality of endpoints 208, 212 (which may be similar or identical to communication devices 108) communicate with one another via a conference focus 204. The conference focus 204, in some embodiments, is established at the conference mixer 124 and may, therefore, reside either at a conference server 120 or communication device 108.

A first endpoint 208 may correspond to an endpoint which places the conference call on hold whereas second endpoints 212 may correspond to endpoints which continue to engage in a conference call even while the first endpoint 208 places the conference on hold.

In some embodiments, the music source 216 may be provided at the same enterprise network 116 as the conference focus 204. More specifically, a music source 216 that is relatively close to the conference focus 204 may be selected to connect to the conference focus 204 when the first endpoint 208 places the conference call on hold, regardless of whether the first endpoint 208 is part of the enterprise communication network 116. This helps to minimize costs associated with providing music-on-hold on behalf of the first endpoint 208. However, it may be the case that the music source 216 is co-located with the first endpoint 208 and if the first endpoint is not part of the enterprise communication network 116, then the music source 216 may also not be a part of the enterprise communication network 116. This particular topology would enable the first endpoint 208 to exert more control over the music source 216 (i.e., place specialized music selected by a user of the first endpoint 208) and may account for situations where the conference focus 204 is not at a location having a local music source 216.

In either scenario, the first endpoint 208 may initially connect with the conference focus 204 by exchanging one or more SIP messages over a first communication link 220. In some embodiments, the messages exchanged over the first communication link 220 include an INVITE, OK, and/or ACK message. When the first endpoint 208 places the conference on hold, the first endpoint 208 may transmit a REFER/Replace SIP message via a second communication link 228 to a music source 216 (which may be similar or identical to the on-hold server 128). The music source 216 transmits an INVITE/Replace SIP message to the conference focus 204 via a third communication link 224, which causes the music source 216 to replace the first endpoint 208 as a participant on the conference call. As long as the first endpoint 208 is on hold, the music source 216 maintains its connection with the conference focus 204. While connected with the conference focus 204, the music source 216 utilizes its intelligence (i.e., the conference monitoring module 132 and response module 136) to monitor voice activity at the conference 204 and determine when and with what amount of volume the music-on-hold should be provided to the conference focus 204. Once the first endpoint 208 decides to take the conference call off hold, the first endpoint 208 may send one or more INVITE/Replace SIP messages to the music source

216 and/or conference focus 204 to re-establish its connection with the conference focus 204 in substitution of the music source 216.

Figure 3:
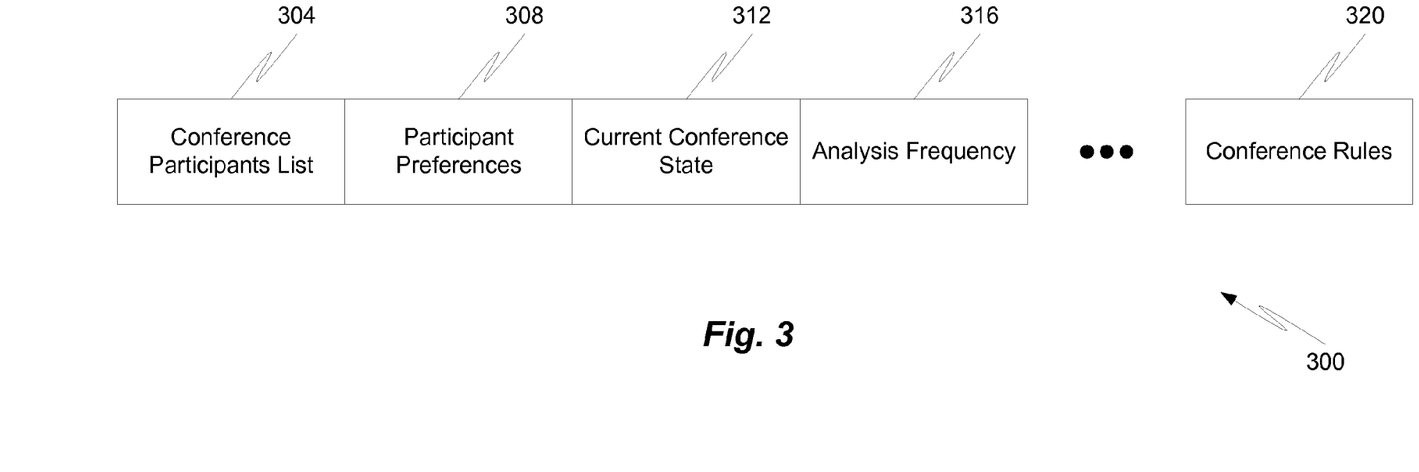
FIG. 3 is a block diagram of a data structure utilized in accordance with embodiments of the present disclosure.

With reference now to FIG. 3, an exemplary data structure 300 utilized in accordance with embodiments of the present disclosure will be described. The data structure 300 may reside partially or completely in one or more of a communication device 108, the conference server 120, and on-hold server 128. In some embodiments, certain aspects of the data structure 300 are maintained on the communication device 108 and retrieved by the on-hold server 128 when it is engaged in a conference for one or more participants. Connection of the on-hold server 128 to a conference may be done at the initiation of the conference or after the conference has been established (e.g., only after one participant places the conference on hold). Regardless of when the on-hold server 128 is connected to the conference, the on-hold server 128 may be configured to retrieve conference participant preferences from the various communication devices 108 to assist in the construction of the data structure 300.

As can be appreciated, the data structure 300 may be utilized by one or more modules of the on-hold server 128 to facilitate intelligent and user-friendly on-hold treatment of a conference. In some embodiments, the data structure 300 may include one or more data fields including, without limitation, a conference participant list field 304, a participant preference field 308, a current conference state field 312, an analysis frequency field, and a conference rules field 320.

The conference participant list field 304 may comprise a listing of participants to a conference. Since a conference can include a communication session between two, three, four, or more participants, each of whom may be utilizing a separate communication device 108, the conference participant list field 304 may contain information identifying the participants, the communication devices 108 being used by the participants, addresses of the communication devices 108 being used by the participants, and any other information which identifies a participant such as the participant's job title, business affiliation, contact information, and the like.

The participant preferences field 308 may contain information which identifies a participant's individual communication preferences. For example, one participant may have a preference to provide music-on-hold to other conference participants when they place a conference on hold, whereas other participants may have a preference to only provide an on-hold indicator or no on-hold treatment at all. Other communication preferences which may be maintained in the participant preferences field 308 include, without limitation, audio processing preferences (audio codecs), video processing preferences (video codecs), communication needs (e.g., whether a participant is hearing-impaired), and the like.

The current conference state field 312 may contain information about a conference recently retrieved from the conference monitoring module 132. In particular, the current conference state field 312 may identify whether participant activity is currently detected on a conference, whether one or more participants have placed the conference on hold, or whether any triggers for initiating the response module 136 have been detected.

The analysis frequency field 316 may contain information which defines whether and how often the conference state should be analyzed by the conference monitoring module 132. In some embodiments, the analysis frequency field 316 may simply provide a predetermined amount of time that should elapse between when the conference activity is analyzed. In some embodiments, multiple different periods of time may be identified, where each different period of time corresponds to a different conference state. For example, a first period of time for analyzing the conference state may be followed if only one participant has placed the conference on hold whereas a second period of time, different from the first period of time, may be followed if more than one participant has placed the conference on hold. As another example, a first period of time for analyzing the conference state may be followed if activity has recently been detected whereas a second period of time (e.g., shorter than the first period of time) may be followed if activity has not been recently detected to ensure a quicker detection of new activity after the period of inactivity.

The conference rules field 320 may contain information which defines rules for the conference, which may be based upon limitations of the conference mixer 124 (e.g., conference size limitations), personal preferences of the conference participants as defined in the participant preferences field 308, and operational parameters of the on-hold server 128 (e.g., administrative settings indicating that on-hold indicators should be provided to a conference before on-hold-music is provided). The various conference rules in the conference rules field 320 may be maintained as Boolean-based rules, if-then rules, or any other rule statements known in the computing arts.

It should be appreciated that the contents of any one field in the data structure 300 may be utilized to determine contents of other fields. As one example, data in the conference rules 320 and/or participant preferences 308 may alter the values in the analysis frequency field 316 (i.e., the analysis frequency may depend upon conference rules or participant preferences).

Figure 4:
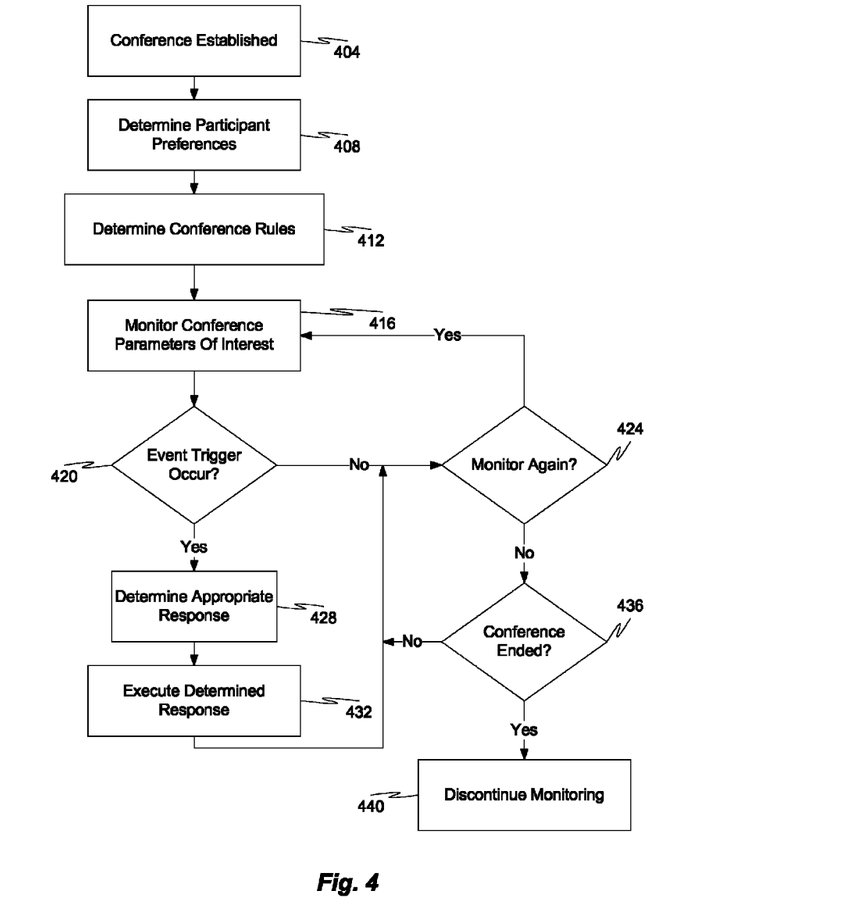
FIG. 4 is a flow diagram depicting a communication method in accordance with embodiments of the present disclosure.

With reference now to FIG. 4, an exemplary communication method will be described in accordance with at least some embodiments of the present invention. The method is initiated when a conference is established between two or more participants utilizing two or more communication devices 108 (step 404). In some embodiments, there may be three, four, five, or more participants each utilizing separate communication devices 108. In some embodiments, two or more participants may be sharing a communication device 108. In embodiments where the conference involves only a first and second communication device 108, a media stream may be established directly between the communication devices 108.

Before or after the conference has been established, the method continues with an on-hold server 128 determining participant preferences and building a data structure 300 to facilitate on-hold functionality, if such functionality becomes needed due to one or more participants placing the conference on hold (step 408). Thereafter or simultaneously, the on-hold server 128 determines conference rules to determine exactly how the response module 136 is to behave during the conference (step 412). The conference rules may be determined, at least in part, based on the participant preferences.

Once conference rules have been established, the method proceeds with the on-hold server 128 monitoring one or more conference parameters of interest (step 416). In some embodiments, the on-hold server 128 may connect to a conference server 120 or more specifically a conference mixer 124 (whether on the conference server 120 or communication device 108) to enable the on-hold server 128 to monitor conference activity. Where the conference involves only two communication devices, an on-hold server 128 may be inserted into the media and/or control stream established between the communication devices 108 as a sequenced application.

In some embodiments, such as those where functions of the on-hold server 128 are provided as an application on the communication device 108, the on-hold server 128 may be configured to monitor a conference without being inserted into either the media or control stream but rather may obtain copies of the exchanged communications after they are received at a communication device 108.

The parameters monitored by the on-hold server 128 may include one or more of voice activity, frequency of voice activity, amplitude of voice activity, number of participants providing voice activity, whether participants are responding to other participants, participant movement, participant presence, and the like.

The conference monitoring module 132 takes the monitored parameters and updates their values in the appropriate field of the data structure 300. The response module 136 then analyzes the updated data structure 300 to determine whether an event trigger has occurred which requires activity from the response module 136 (step 420). If no such activity is detected, then the method proceeds by determining whether the conference activity should be monitored again (step 424). If this query is answered affirmatively, then the method returns to step 416. If the query is answered negatively, then the method proceeds to determine if the conference has ended (step 436). This query may be answered by determining whether the communication channel established for the conference has been torn down, whether all but one of the communication devices 108 have hung-up, and the like. If this query is answered affirmatively, then the on-hold server 128 discontinues monitoring of the conference (step 440). Otherwise, the method returns to step 424.

The analysis at step 424 may involve considering a number of parameters. In embodiments where the conference is continuously monitored, however, the answer to the query will always be affirmative unless the conference has ended. In embodiments where the conference is not continuously monitored (i.e., the conference activity is monitored periodically), the conference monitoring module 132 may adjust the amount of times between its analysis of the conference depending upon the state of the conference. For instance, the conference monitoring module 132 may be configured to analyze whether any activity was detected during the last analysis. If no activity was detected, then conference monitoring module 132 may re-analyze the conference more quickly than if activity was detected. As another example, if music-on-hold or some other on-hold indicator is currently being provided to the conference (i.e., conference participant(s) that have not put the conference on hold), then the frequency with which conference activity is monitored may be more frequent than if music-on-hold or some other on-hold indicator is not being provided to the conference.

Referring back to step 420, if an event trigger is detected, then the method continues with the response module 136 determining one or more appropriate responses (i.e., on-hold treatments) to provide to the conference based on the trigger (step 428). Appropriate responses may include one or more of providing an on-hold indicator (audible and/or visual) to conference participant(s) that have not put the conference on hold, providing music-on-hold to conference participant(s) that have not put the conference on hold, providing an on-hold indicator to the conference participant(s) that has put the conference on hold, increasing a volume of music-on-hold being provided to conference participant(s) that have not put the conference on hold, decreasing volume of music-on-hold being provided to conference participant(s) that have not put the conference on hold, increasing a frequency with which an on-hold indicator is provided to conference participant(s) that have not put the conference on hold, adjusting a frequency with which the conference activity should be analyzed, altering the data structure 300 to reflect the wait treatment being provided to the conference, and combinations thereof. Furthermore, the response module 136 may be configured to provide different on-hold treatments to different conference participants based on each participant's preferences which are defined in the data structure 300. Thus, a first on-hold treatment may be provided to one participant whereas a second different on-hold treatment may be provided to another participant.

After the response module 136 has determined the appropriate response(s) to provide to the conference, the method continues with the response module 136 executing the determined response(s) (i.e., providing the determined responses to the conference and/or performing any other steps necessary to achieve the determined response) (step 432). Thereafter, the method proceeds to step 424.

Figure 5:
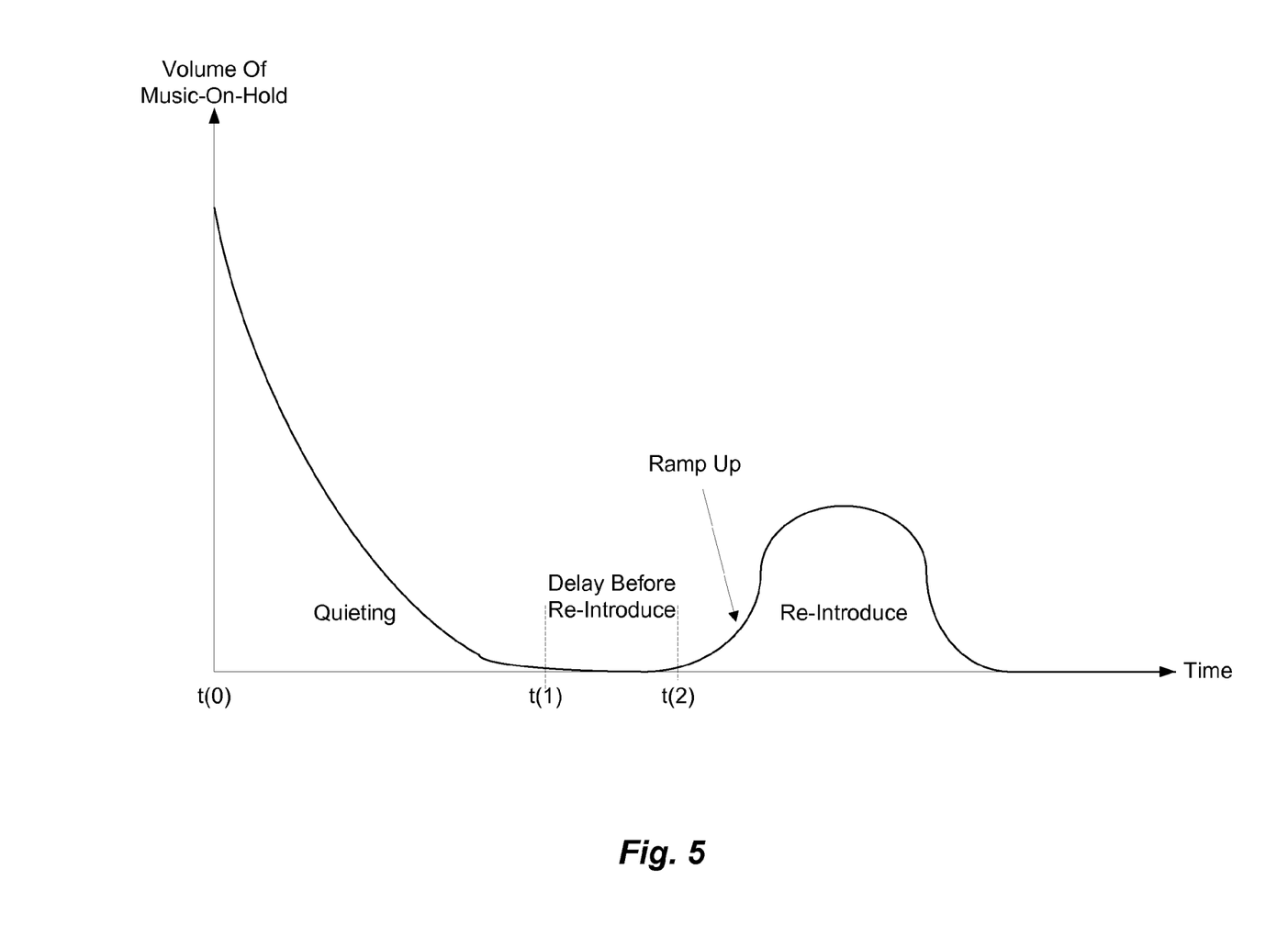
FIG. 5 is a chart depicting on-hold music volume as a function of time in accordance with embodiments of the present disclosure.

Referring now to FIG. 5, further intelligent behaviors of the on-hold server 128 will be described in accordance with at least some embodiments of the present disclosure. Once an on-hold server 128 is connected to a conference call, the on-hold server 128 may begin analyzing conference activity. If a predetermined amount of activity is not detected for a predetermined amount of time, then the response module 136 may begin providing on-hold music to the conference mixer 124. Time t(0) represents a point in time when the conference monitoring module 132 detects at least some amount of activity by other participants of the conference call and shows how, upon detecting such activity, the response module 136 begins to reduce the volume with which the on-hold music is provided to the conference mixer 124. If the conference monitoring module 132 continues to detect activity, the response module 136 will continue to reduce the volume of the on-hold music until it is no longer being provided to the conference mixer 124.

Time t(1) represents a point in time when the conference monitoring module 132 detects no further voice activity, or at least no more than a predetermined amount of voice activity, by the other participants of the conference call. The conference monitoring module 132 does not automatically and immediately invoke the response module 136 to begin providing on-hold music again. Rather, there is a delay period between time t(1) and t(2) where for a predetermined amount of time the on-hold music is not provided to the conference call even though no activity is detected. This enables the on-hold server 128 to account for natural pauses in conversation and helps ensure that only extended amounts of silence are filled with on-hold music.

After the conference monitoring module 132 has waited for a predetermined amount of time, allowed for a delay between time t(1) and t(2) to pass, and confirmed that no further voice activity is detected at the conference call, the response module 136 may be re-invoked and music-on-hold may be re-introduced back to the conference mixer 124 by gently increasing the volume of the music-on-hold. This will continue until more voice activity is detected at the conference call or until the conference call is taken off hold by the user that initiated use of the on-hold server 128.

In the foregoing description, for the purposes of illustration, methods were described in a particular order. It should be appreciated that in alternate embodiments, the methods and steps thereof may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A method, comprising:
while a conference is established between at least a first and second participant utilizing a first and second communication device, respectively, determining that the first participant has put the conference on hold with the first communication device;
at a first time while the first participant has put the conference on hold, analyzing one or more conference parameters of interest to determine conference activity, wherein the one or more conference parameters of interest analyzed at the first time include at least one of voice activity, frequency of voice activity, amplitude of voice activity, number of participants providing voice activity, whether participants are responding to other participants, movement of the second participant, and presence of the second participant;
determining, at the first time, that conference activity has been detected;
in response to determining, at the first time, that conference activity has been detected, providing a first on-hold treatment to at least the second participant, the first on-hold treatment corresponding to at least one of an audible on-hold indicator, a visual on-hold indicator, and an audible notification provided by a whisper page to the second participant;
at a second time while the first participant has put the conference on hold, analyzing one or more conference parameters of interest to determine conference activity, wherein the one or more conference parameters of interest analyzed at the second time include at least one of voice activity, frequency of voice activity, amplitude of voice activity, number of participants providing voice activity, whether participants are responding to other participants, movement of the second participant, and presence of the second participant, and wherein the one or more conference parameters of interest analyzed at the first time are different from the one or more conference parameters of interest analyzed at the second time;
determining, at the second time, that conference activity has not been detected; and
in response to determining, at the second time, that conference activity has not been detected, providing a second on-hold treatment to at least the second participant, the second on-hold treatment corresponding to at least one of a beep, a tone, and music-on-hold.

2. The method of claim 1, wherein the first on-hold treatment is at least one of an audible and visual on-hold indicator which includes at least one of a beep, a tone, a flashing light, and a text message.

3. The method of claim 2, wherein the second on-hold treatment is music-on-hold.

4. The method of claim 3, wherein music-on-hold is suppressed between the first time and the second time.

5. The method of claim 1, wherein the first on-hold treatment comprises an audible notification provided by a whisper page.

6. The method of claim 1, further comprising:
at a third time while the first participant has put the conference on hold, analyzing one or more conference parameters of interest to determine conference activity;
determining, at the third time, that conference activity has been detected; and
in response to determining, at the third time, that conference activity has been detected, discontinuing the second on-hold treatment.

7. The method of claim 1, wherein at least a third participant is engaged in the conference with a third communication device, wherein the media streams of the first, second, and third participants are mixed at a conference mixer, and wherein the conference mixer resides on one of the first, second, and third communication devices.

8. A communication apparatus, comprising:
a conference monitoring module configured to determine that a first participant of a conference has put the conference on hold at a first time and, at the first time, analyze one or more conference parameters of interest to determine conference activity, wherein the one or more conference parameters of interest analyzed at the first time include at least one of voice activity, frequency of voice activity, amplitude of voice activity, number of participants providing voice activity, whether participants are responding to other participants, movement of the second participant, and presence of the second participant, wherein the conference monitoring module is further configured to monitor one or more conference parameters of interest at a second time while the conference is still on hold and analyze one or more conference parameters of interest at the second time, wherein the one or more conference parameters of interest analyzed at the second time include at least one of voice activity, frequency of voice activity, amplitude of voice activity, number of participants providing voice activity, whether participants are responding to other participants, movement of the second participant, and presence of the second participant, and wherein the one or more conference parameters of interest analyzed at the first time are different from the one or more conference parameters of interest analyzed at the second time; and a response module configured to receive information from the conference monitoring module regarding conference activity at the first and second times and, based on the information received from the conference monitoring module, dynamically adjust on-hold treatment provided to participants of the conference by providing a first on-hold treatment at the first time and a second on-hold treatment at the second time, wherein the first on-hold treatment corresponds to at least one of an audible on-hold indicator, a visual on-hold indicator, and an audible notification provided by a whisper page to the second participant, and wherein the second on-hold treatment corresponds to at least one of a beep, a tone, and music-on-hold.

9. The apparatus of claim 8, wherein at least one of the first and second on-hold treatment is provided to all participants of the conference other than the first participant.

10. The apparatus of claim 8, wherein a second and third participant are involved in the conference, wherein the first on-hold treatment is provided to the second participant based on preferences of the second participant, and wherein the second on-hold treatment is provided to the third participant based on preferences of the third participant.

11. The apparatus of claim 10, wherein the first participant is utilizing a first communication device, wherein the second participant is utilizing a second communication device, wherein the third participant is utilizing a third communication device, and wherein the conference is hosted on one of the first, second, and third communication devices.

12. The apparatus of claim 8, wherein the conference monitoring module is configured to continuously monitor the conference for activity during the time in which the conference is put on hold by the first participant.

13. The apparatus of claim 8, wherein the conference monitoring module is configured to periodically monitor the conference activity during the time in which the conference is put on hold by the first participant and wherein the amount of time allowed to pass between instances where the conference activity is analyzed depends upon whether activity was detected at a previous instance.

14. The system of claim 8, further comprising a conference mixer configured to mix audio input from participants of the conference.

15. The system of claim 8, wherein the response module is configured to partially suppress music-on-hold when the conference monitoring module detects voice activity of only one conference participant.

* * * * *